US012734925B2

(12) United States Patent
Matsumoto et al.

(10) Patent No.: US 12,734,925 B2
(45) Date of Patent: Sep. 15, 2026

(54) SERVER AND SYSTEM FOR SUPPORTING AN ELECTRIFIED VEHICLE

(71) Applicant: TOYOTA JIDOSHA KABUSHIKI KAISHA, Toyota (JP)

(72) Inventors: Takashi Matsumoto, Toyota (JP); Keiko Hasegawa, Toyota (JP); Masashi Takahashi, Nagoya (JP); Tohru Nakamura, Toyota (JP); Ai Miyata, Sakai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 731 days.

(21) Appl. No.: 18/324,254

(22) Filed: May 26, 2023

(65) Prior Publication Data

US 2024/0034178 A1 Feb. 1, 2024

(30) Foreign Application Priority Data

Aug. 1, 2022 (JP) ................................ 2022-122710

(51) Int. Cl.
*B60L 53/63* (2019.01)
*B60L 53/62* (2019.01)

(52) U.S. Cl.
CPC ............... *B60L 53/63* (2019.02); *B60L 53/62* (2019.02)

(58) Field of Classification Search
CPC ...... B60L 53/63; B60L 53/62; B60L 2240/70; B60L 53/11; B60L 53/68; B60L 53/665; B60L 55/00; G06Q 50/40; G06Q 30/0226; G06Q 50/06; G06Q 10/063; Y02T 90/167; G07F 15/005; G07F 15/008; H02J 3/322; H02J 7/44
See application file for complete search history.

(56) References Cited

U.S. PATENT DOCUMENTS

| | | | | |
|---|---|---|---|---|
| 7,991,665 | B2 * | 8/2011 | Hafner | B60L 53/64 705/35 |
| 8,725,551 | B2 * | 5/2014 | Ambrosio | B60L 55/00 705/7.31 |
| 8,849,687 | B2 * | 9/2014 | Hakim | G05F 1/66 705/7.13 |
| 9,429,974 | B2 * | 8/2016 | Forbes, Jr. | G05F 1/66 |
| 9,789,779 | B2 * | 10/2017 | Shimizu | B60L 53/305 |
| 10,191,459 | B2 * | 1/2019 | Oono | B60L 53/63 |
| 10,829,001 | B2 * | 11/2020 | Mizutani | B60L 53/65 |
| 11,321,789 | B2 * | 5/2022 | Yokoyama | G06Q 40/04 |
| 11,456,619 | B2 * | 9/2022 | Kawamura | G05F 1/66 |
| 11,816,938 | B2 * | 11/2023 | Tsuchiya | G07C 5/0816 |

(Continued)

FOREIGN PATENT DOCUMENTS

| | | | |
|---|---|---|---|
| CN | 112783521 | A | 5/2021 |
| CN | 113428048 | A | 9/2021 |

(Continued)

*Primary Examiner* — Jared Fureman

(74) *Attorney, Agent, or Firm* — Finnegan, Henderson, Farabow, Garrett and Dunner, LLP

(57) ABSTRACT

The server includes a communication unit that acquires, by communication, information related to a performance in power control of electrified vehicle. In addition, the server includes a processor (control unit) that performs control to provide a privilege related to the communication service to the user of electrified vehicle based on the acquired information related to the track record.

9 Claims, 3 Drawing Sheets

(56) References Cited

U.S. PATENT DOCUMENTS 11,858,371 B2 * 1/2024 Ando ...................... B60L 58/26
11,987,146 B2 * 5/2024 Tsuchiya ................. B60L 50/60
12,024,048 B2 * 7/2024 Hishida ..................... H02J 7/00
12,175,491 B2 * 12/2024 Yumita ................... B60L 53/62
12,263,751 B2 * 4/2025 Munemoto ........... B60L 53/305
2008/0040263 A1 * 2/2008 Pollack .................. G06Q 50/00 705/39
2012/0197693 A1 * 8/2012 Karner ................... G06Q 10/02 705/14.1
2014/0337253 A1 * 11/2014 Berezin .................. G06Q 50/06 705/412
2015/0046222 A1 * 2/2015 Ishii ................... G06Q 30/0237 705/7.31
2016/0297316 A1 * 10/2016 Penilla ............... G06Q 30/0232
2020/0175614 A1 * 6/2020 Fox ......................... B60L 53/14
2021/0141629 A1 * 5/2021 Ariga ........................ G06F 8/65
2021/0295619 A1 * 9/2021 Tsuchiya ................. B60L 53/62
2021/0334719 A1 * 10/2021 Hishida .............. G06Q 10/1093
2021/0334915 A1 * 10/2021 Hishida ................... H02J 3/322
2021/0380014 A1 * 12/2021 Hishida ..................... H02J 7/00
2022/0161679 A1 5/2022 Sugimoto et al.
2023/0013447 A1 * 1/2023 Yamauchi ............. B60L 53/665
2023/0095670 A1 * 3/2023 Asakura .................. B60L 55/00 320/109
2023/0264586 A1 * 8/2023 Okubo .................... B60L 53/64 700/297
2023/0267838 A1 * 8/2023 Okubo ................... G08G 1/207
2023/0350367 A1 * 11/2023 Tomita .................. G07F 15/005
2024/0037589 A1 * 2/2024 Matsumoto ............. B60L 53/65
2024/0403975 A1 * 12/2024 Mooney ................. G06Q 10/00

FOREIGN PATENT DOCUMENTS

CN 114537162 A 5/2022
JP 2011-139580 A 7/2011
JP 2016-218648 A 12/2016
JP 2024-528397 A 7/2024
KR 20210148759 A * 12/2021 ............. G06Q 50/06
WO WO 2022/271080 A1 12/2022

* cited by examiner

Figure 1:
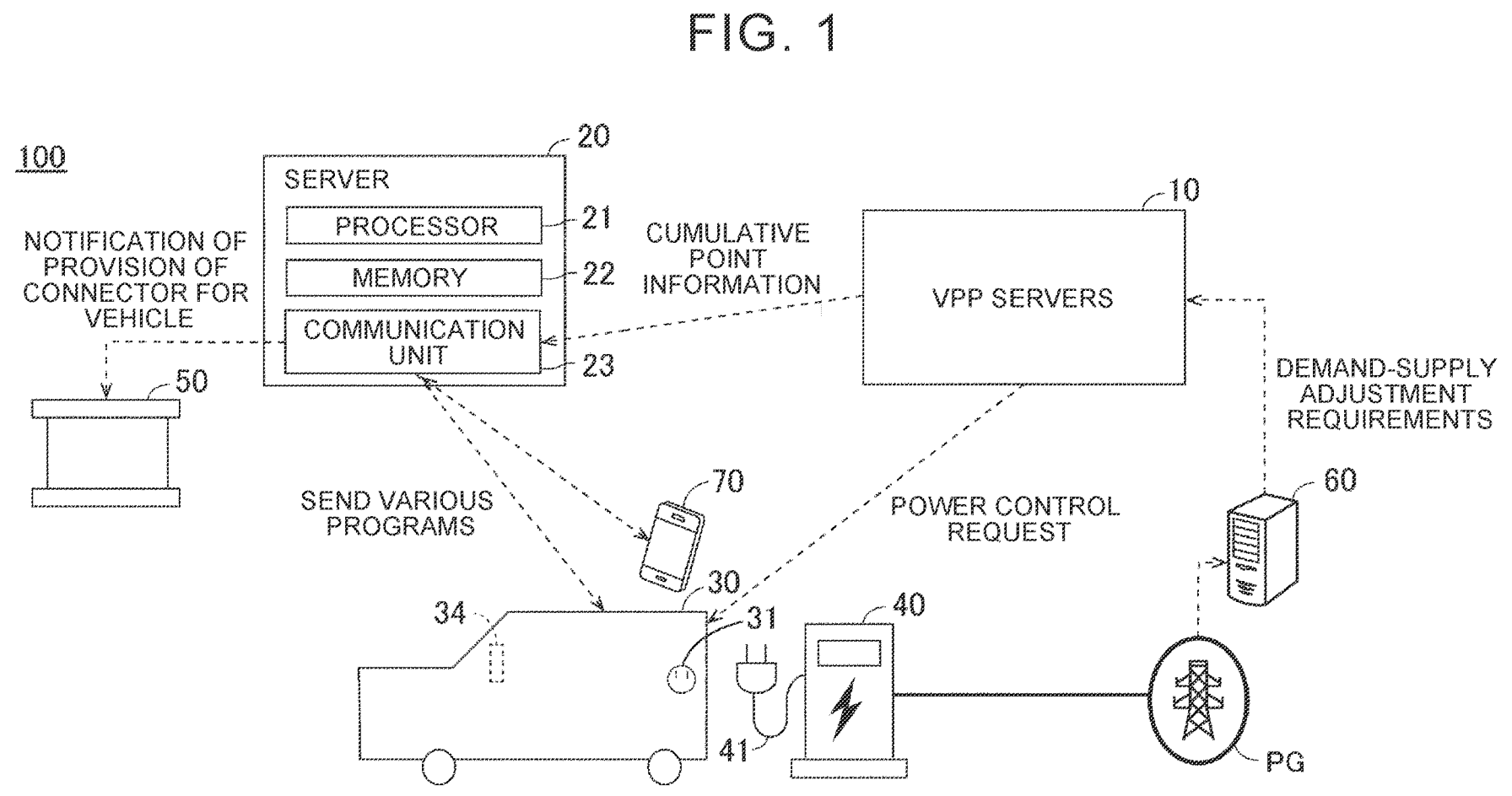

VPP SERVERS
10
DEMAND-SUPPLY
ADJUSTMENT
REQUIREMENTS
60
PG
POWER CONTROL
REQUEST
40
41
31
30
70
CUMULATIVE
POINT
INFORMATION
SERVER
20
PROCESSOR
21
MEMORY
22
COMMUNICATION
UNIT
23
SEND VARIOUS
PROGRAMS
34
NOTIFICATION OF
PROVISION OF
CONNECTOR FOR
VEHICLE
50

FIG. 2
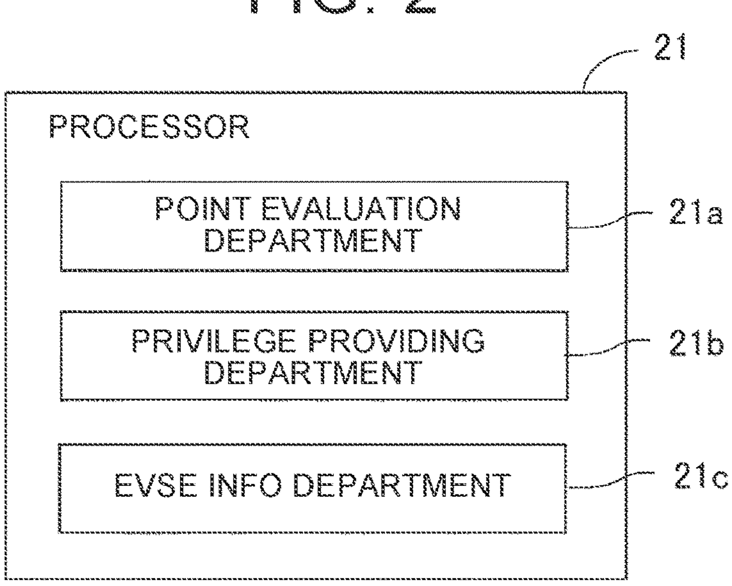
FIG. 3
| PERFORM POWER CONTROL | DISCOUNT FOR THE USE OF TELECOMMUNICATIONS SERVICES |
|---|---|
| CUMULATIVE POINT IS 100P OR MORE | PROVIDE COLOR CHANGE PROGRAMS |
| CUMULATIVE POINT IS 200P OR MORE | PROVIDES AN UPDATED CHARGING PROGRAM B FOR CHARGING PROGRAM A |
| CUMULATIVE POINT IS 300P OR MORE | - PROVIDES CHARGING PROGRAM C FOR QUICK CHARGING<br>- VEHICULAR CONNECTOR FOR QUICK CHARGING |
FIG. 4
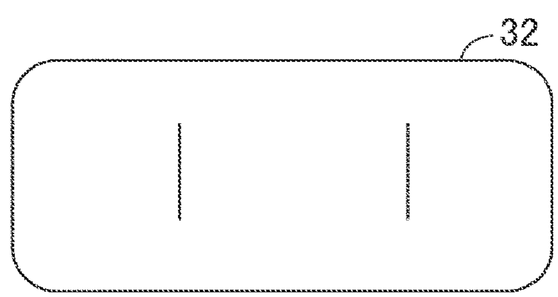

SERVER AND SYSTEM FOR SUPPORTING AN ELECTRIFIED VEHICLE

CROSS-REFERENCE TO RELATED APPLICATION

This application claims priority to Japanese Patent Application No. 2022-122710 filed on Aug. 1, 2022, incorporated herein by reference in its entirety.

BACKGROUND

1. Technical Field

The present disclosure relates to a server and a system.

2. Description of Related Art

Japanese Unexamined Patent Application Publication No. 2011-139580 (JP 2011-139580 A) discloses a charging device including a camera that reads the number of a stopped vehicle. The charging device permits use of the charging device when the read number is the vehicle number of the registered user.

SUMMARY

However, as in JP 2011-139580 A, only permission of the use of the charging device by reading the number by the camera is not enough to lead to promotion of the use of power control (external charging and external power supply in response to a power balancing request) using the charging device. Therefore, further promotion of the use of the power control using the charging device is desired.

The present disclosure has been made in order to solve the above problem, and an object thereof is to provide a server and a system capable of further promoting the power control.

A server according to a first aspect of the present disclosure is a server that manages a communication service for supporting an electrified vehicle that is able to execute power control including at least one of power supply to a power grid and charging from the power grid.

The server includes: a communication unit that acquires, through communication, information related to a track record of the power control executed by the electrified vehicle in accordance with a request from a power control server that manages the power control; and a control unit that executes control to provide a user of the electrified vehicle with a privilege related to the communication service based on the acquired information related to the track record.

In the server according to the first aspect of the present disclosure, a user of the electrified vehicle is provided with a privilege related to the communication service based on the acquired information related to the track record of the power control, as described above. With the above, it is possible to increase the motivation of the user for the power control by the privilege related to the communication service. As a result, the power control can be further promoted.

In the server according to the first aspect above, the control unit preferably executes control to discount a usage fee of the communication service based on the acquired information on the track record. With this configuration, it is possible to easily increase the motivation of the user for the power control by discounting the usage fee of the communication service.

In the server according to the first aspect above, the control unit preferably transmits a vehicular program for the communication service to the electrified vehicle of the user via the communication unit based on the acquired information on the track record. With this configuration, it is possible to easily increase the motivation of the user for the power control by providing the vehicular program.

In this case, the electrified vehicle preferably includes a first power control program.

The control unit transmits a second power control program that is an updated version of the first power control program to the electrified vehicle of the user via the communication unit when an accumulated value of points accumulated as the power control is executed becomes equal to or larger than a first threshold value. With this configuration, it is possible to easily increase the motivation of the user of the electrified vehicle provided with the first power control program for the power control.

In the server according to the first aspect above, the electrified vehicle preferably includes a third power control program corresponding to at least one of normal charge and normal power supply.

The control unit transmits a fourth power control program corresponding to at least one of quick charge and quick power supply to the electrified vehicle of the user via the communication unit when an accumulated value of points accumulated as the power control is executed becomes equal to or larger than a second threshold value.

With this configuration, it is possible to easily increase the motivation of the user of the electrified vehicle provided with the third power control program for the power control.

In this case, the control unit preferably executes control to provide the user with a vehicular connector corresponding to the at least one of the quick charge and the quick power supply. With this configuration, the user does not need to purchase a vehicular connector, and therefore it is possible to reduce the labor and cost of the user. As a result, it is possible to suppress the motivation of the user for the power control from being reduced.

In the server according to the first aspect above, the electrified vehicle preferably includes a light emitting unit that emits light in a predetermined color. The control unit transmits a color change program for changing the color of the light emitting unit to the electrified vehicle of the user via the communication unit when an accumulated value of points accumulated as the power control is executed becomes equal to or larger than a third threshold value. With this configuration, the atmosphere in the vehicle can be changed by changing the color of the light emitting unit, and thus the motivation of the user who desires to change the atmosphere in the vehicle for the power control can be easily increased.

In the server according to the first aspect above, the communication unit preferably communicates with a mobile terminal of the user in which a travel plan of the electrified vehicle is stored. With this configuration, it is possible to notify the user of the position, time, and the like at which power control can be performed based on the travel plan of the electrified vehicle.

In the server according to the first aspect above, the electrified vehicle preferably includes a navigation system and is electrically connected to a power station to enable the power control, and the control unit preferably executes control to notify the user of the electrified vehicle of a position of the power station through the navigation system. With this configuration, the position of the power station can be easily understood by the navigation system, and thus the power control can be easily performed in the power station. As a result, the power control can be further promoted.

A system according to a second aspect of the present disclosure includes the server according to the first aspect above and the electrified vehicle, the server transmits a vehicular program for a communication service for supporting the electrified vehicle to the electrified vehicle, and the electrified vehicle executes a process of updating a program of the electrified vehicle to the transmitted vehicular program.

With this, it is possible to easily increase the motivation of the user for the power control by providing the vehicular program. As a result, it is possible to provide a system capable of further promoting the power control.

As a result, the power control can be further promoted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram illustrating a configuration of a vehicle system according to an embodiment;

FIG. 2 is a block diagram illustrating functional features of a processor of a server according to one embodiment;

FIG. 3 is a diagram illustrating a correspondence relationship between a result of power control and a privilege;

FIG. 4 is a diagram illustrating a vehicular system provided as a benefit;

DETAILED DESCRIPTION OF EMBODIMENTS

Figure 5:
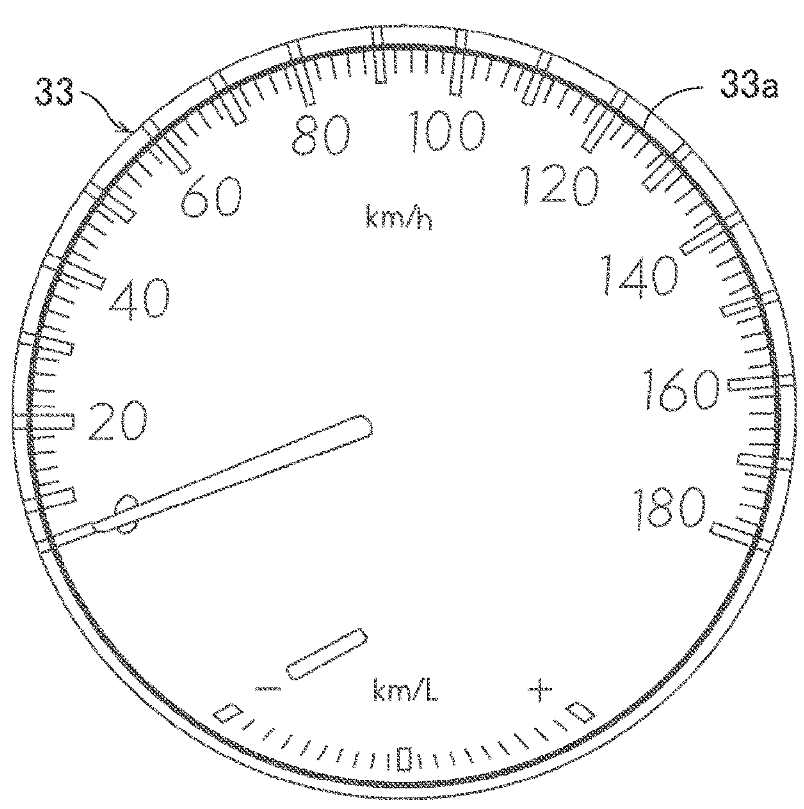
FIG. 5 is a diagram illustrating a speedometer of an electrified vehicle.

Hereinafter, embodiments of the disclosure will be described in detail, with reference to the drawings. In the drawings, the same or corresponding parts are denoted by the same reference signs and the description thereof will not be repeated.

FIG. 1 is a diagram illustrating a system 100 including a server 20 according to the present embodiment. The system 100 includes a VPP (Virtual Power Plant) server 10, a server 20, an electrified vehicle 30, EVSE (Electric Vehicle Supply Equipment) 40, a dealer 50, a grid management server 60, and a power grid PG. Although one electrified vehicle 30, EVSE 40 and one dealer 50 are illustrated in FIG. 1, a plurality of dealers may be provided. Further, EVSE 40 is an exemplary "power station" of the present disclosure.

Electrified vehicle 30 is configured to be capable of charging and discharging the power grid PG. In other words, electrified vehicle 30 can supply power to the power grid PG (external power supply) and charge from the power grid PG (external charge). Hereinafter, the above-described power supply and charging are collectively referred to as "power control". The power control can be performed through EVSE 40. VPP servers 10 manage power control by electrified vehicle 30. Electrified vehicle 30 includes, for example, PHEV (Plug-in Hybrid Electric Vehicle) vehicles, BEV (Battery Electric Vehicle) vehicles, and FCEV (Fuel Cell Electric Vehicle) vehicles. Note that VPP server 10 is an exemplary "power control server" of the present disclosure.

The power grid PG is a power grid constructed by a power plant and a transmission and distribution facility (not shown). In the present embodiment, the electric power company also serves as a power generation company and a power transmission and distribution company. The electric power companies correspond to ordinary transmission and distribution companies, and maintain and manage the power grid PG. The electric power companies correspond to administrators of the power grid PG.

The grid management servers 60 manage the supply and demand of the power grid PG (power grid). The grid management server 60 belongs to a power company. The grid management server 60 transmits a request (supply-demand adjustment request) for adjusting the power demand of the power grid PG to VPP server 10 on the basis of power generation and consumption by the respective power adjustment resources managed by the grid management server 60. Specifically, the grid management server 60 transmits, to VPP server 10, a demand for increasing or decreasing the power demand than in the normal state when the generated power or the consumed power of the power adjusting resource is expected to be larger than in the normal state (or when the consumed power is currently larger).

VPP server 10 is a server managed by an aggregator. An aggregator is an electric utility that provides an energy management service by bundling a plurality of power adjustment resources such as a region and a predetermined facility.

VPP servers 10 request electrified vehicle 30 to perform power control as one way to increase or decrease the power demand of the power grid PG. VPP servers 10 transmit a request signal for making the request to electrified vehicle 30 to the mobile terminal 70 or the like owned by the user of electrified vehicle 30 or electrified vehicle 30.

VPP servers 10 are configured to manage information of a plurality of registered electrified vehicle 30 (hereinafter, also referred to as "vehicle information"), information of registered users (hereinafter, also referred to as "user information"), and information of registered EVSE 40 (hereinafter, also referred to as "EVSE information"). The user information, the vehicle information, and EVSE information are distinguished by the identification information (ID) and stored in a memory (not shown) of VPP servers 10.

The user ID is identification information for identifying the user, and also functions as information (terminal ID) for identifying the mobile terminal 70 carried by the user. VPP servers 10 are configured to store data received from the mobile terminals 70 separately for each user ID. The user data includes a communication address of the mobile terminal 70 carried by the user and an ID of electrified vehicle 30 vehicles belonging to the user.

The vehicle ID is identification information for identifying electrified vehicle 30. The vehicular ID may be a license plate or may be a Vehicle Identification Number (VIN). Vehicle-information includes electrified vehicle 30 action schedules.

EVSE-ID is identification information for identifying EVSE 40. EVSE data includes the communication addresses of the respective EVSE 40 and the status of electrified vehicle 30 connected to the respective EVSE 40. EVSE information also includes information indicating a combination of electrified vehicle 30 and EVSE 40 connected to each other (for example, a combination of an EVSE-ID and a vehicular ID).

EVSE 40 means a vehicular power supply facility. Electrified vehicle 30 is configured to be electrically connectable to EVSE 40. For example, by connecting the charge cable 41 connected to EVSE 40 to the connector 31 of electrified vehicle 30, power can be exchanged between EVSE 40 and electrified vehicle 30.

the server 20 includes a processor 21, a memory 22, and a communication unit 23. The server 20 is a server that manages communication services for supporting electrified vehicle 30. The processor 21 is an example of a "control unit" of the present disclosure.

in the memory 22, information (for example, a map, a mathematical expression, and various parameters) used in the program is stored in addition to the program executed by the processor 21. The communication unit 23 includes various communication I/F. The processor 21 controls the communication unit 23.

the memory 22 stores a plurality of programs for the communication service. The plurality of programs includes a program for providing traffic information, a program for providing accident and weather information, and a program for power control (external charging and external power supply).

the communication unit 23 communicates with each of VPP servers 10, electrified vehicle 30, the dealer 50, and the mobile terminal 70.

VPP servers 10 record the performance (degree of contribution) in the power control of electrified vehicle 30. Specifically, when electrified vehicle 30 performs power control, a point corresponding to the degree of contribution is given for each electrified vehicle 30 (for each user). Then, the above-mentioned points are accumulated and recorded as a track record corresponding to electrified vehicle 30 (user).

As illustrated in FIG. 2, the processor 21 includes a point-evaluating unit 21*a*, a privilege providing unit 21*b*, and an EVSE informing unit 21*c*. Note that each of the point-evaluating unit 21*a*, the privilege providing unit 21*b*, and EVSE informing unit 21*c* represents software in which functional features of the processor 21 are blocked.

Referring back to FIG. 1, the communication unit 23 of the server 20 acquires, from VPP server 10, information on the actual results (accumulated points) in the power control of electrified vehicle 30. Then, the processor 21 (point evaluator 21*a*) compares the accumulated points with respective thresholds described later.

Here, in the present embodiment, the processor 21 (privilege providing unit 21*b*) performs control to provide the privilege related to the communication service to the user of electrified vehicle 30 on the basis of the information related to the track record in the power control of electrified vehicle 30 acquired by the communication unit 23.

Specifically, the benefit includes discounting a usage fee for the communication service. For example, the processor 21 (privilege providing unit 21*b*) performs control to reduce the monthly usage fee of the communication service corresponding to electrified vehicle 30 where the power control is performed by a predetermined ratio.

Note that the processor 21 (privilege providing unit 21*b*) may discount the usage fee of the communication service only when the cumulative point changes (increases) from 0, for example. Further, the processor 21 (privilege providing unit 21*b*) may discount the usage fee of the communication service when the cumulative point becomes equal to or larger than a predetermined threshold (for example, 50P). In addition, the processor 21 (privilege providing unit 21*b*) may change the discount amount in accordance with the change amount of the point.

The processor 21 (privilege providing unit 21*b*) transmits a vehicular program for communication service to electrified vehicle 30 through the communication unit 23. Thus, the transmitted vehicular program is installed in electrified vehicle 30. Electrified vehicle 30 performs a process of updating its own program to the transmitted vehicular program.

As shown in FIG. 3, the processor 21 (privilege providing unit 21*b*) performs control to update the power control program when the cumulative point of electrified vehicle 30 becomes equal to or larger than the first threshold value (for example, 200 points). Specifically, it is assumed that electrified vehicle 30 has the charging program A and the charging program B, which is an updated version of the charging program A, is stored in the memory 22 of the server 20. The processor 21 (privilege providing unit 21*b*) provides (transmits) the charging program B to electrified vehicle 30 through the communication unit 23 when the cumulative point of electrified vehicle 30 becomes equal to or larger than the first threshold value. Note that the charging program A is an example of the "first power control program" and the "third power control program" of the present disclosure. The charging program B is an example of the "second power control program" and the "vehicle program" of the present disclosure.

Further, it is assumed that the charging program A is a charging program corresponding to normal charging. The processor 21 (privilege providing unit 21*b*) performs control to provide (transmit) the charging program C corresponding to the rapid charging to electrified vehicle 30 through the communication unit 23 when the cumulative point becomes equal to or larger than the second threshold value (for example, 300 points). The charging program C is a program stored in the memory 22 of the server 20. Note that the charging program C is an example of the "fourth power control program" and the "vehicle program" of the present disclosure.

Here, the processor 21 (privilege providing unit 21*b*) performs control to provide electrified vehicle 30 user with the vehicular connector 32 (see FIG. 4) corresponding to the quick charge. Specifically, the processor 21 (privilege providing unit 21*b*) notifies the dealer 50 of the provision of the vehicular connector 32 to the user of electrified vehicle 30 through the communication unit 23. Accordingly, when the user visits the dealer 50 by electrified vehicle 30, the vehicular connector 32 is attached to electrified vehicle 30. Note that the dealer 50 to which the notification is given is, for example, a dealer nearest to the address of the user of electrified vehicle 30. In addition, the notification may be sent to the dealer 50 nearest to the present position of electrified vehicle 30 detected by the position detecting unit or the like. Further, the processor 21 may check the inventory status of the vehicular connector 32 with the dealer 50 before making the notification. In addition, the vehicular connector 32 may be directly sent to the user's home or the like.

Further, as illustrated in FIG. 5, electrified vehicle 30 includes a light emitting unit 33*a* that emits light in a predetermined color (for example, red). For example, the light emitting unit 33*a* is a ring-shaped unit displayed on the outer peripheral portion of electrified vehicle 30 speedometer 33.

Here, in the present embodiment, the processor 21 (privilege providing unit 21*b*) transmits a color change program for changing the color of the light emitting unit 33*a* to electrified vehicle 30 through the communication unit 23 when the cumulative point becomes equal to or larger than the third threshold (for example, 100P). In an electrified vehicle 30 where the color change program is installed, the light emitting unit 33*a* emits light in a color (for example, blue) defined in the color change program. Further, in electrified vehicle 30 where the color change program is installed, the color of the light emitting unit 33*a* may be arbitrarily changeable by the user. The color change program is a program stored in the memory 22 of the server 20. The color change program is an example of a "vehicle program" of the present disclosure.

In the above description, the color of the light emitting unit 33*a* of the speedometer 33 is changed, but the color of the light emitting unit other than the speedometer 33 (for example, LED in the vehicle) may be changed.

In addition to the charging programs B and C and the color change program described above, various programs may be provided to the user as privileges for power control.

Electrified vehicle 30 also includes a navigation system 34 (see FIG. 1). The processor 21 (EVSE data providing unit 21*c*) performs control to notify electrified vehicle 30 user of the position of EVSE 40 capable of power control through the navigation system 34. For example, a position of EVSE 40 capable of power control may be displayed on a display unit (not shown) of the navigation system 34.

The processor 21 (EVSE information providing unit 21*c*) acquires position information of a EVSE 40 capable of power control on the traveling route based on the traveling plan of electrified vehicle 30 stored in the mobile terminal 70. Then, the processor 21 (EVSE information providing unit 21*c*) provides the position information to the user prior to (or during) running of electrified vehicle 30 through the navigation system 34.

Further, the processor 21 may perform control to notify the user of information on the cumulative points held by the current electrified vehicle 30 (user), information on the privilege provided in accordance with the cumulative points, and the like through electrified vehicle 30 navigation system 34.

As described above, in the present embodiment, the processor 21 performs control to provide a privilege related to the communication service to the user of electrified vehicle 30 on the basis of the acquired information on the track record of the power control. Accordingly, the power control can be activated by the user who intends to improve the above-described performance for the purpose of the privilege.

In the above-described embodiment, various programs stored in the memory 22 of the server 20 are provided to electrified vehicle 30, but the present disclosure is not limited thereto. For example, various programs stored in the cloud may be provided (transmitted) to electrified vehicle 30 under the control of the processor 21. In addition, various programs may be transmitted to the mobile terminal 70 of the user.

In the above-described embodiment, the server 20 discounts the communication service fee and provides various programs as privileges for power control, but the present disclosure is not limited thereto. For example, money may be paid to a user who has performed power control.

Further, in the above embodiment, the charging program (B, C) is provided as a privilege of the power control, but the present disclosure is not limited thereto. A power supply program may be provided as a power control benefit. In addition, both the power supply program and the charging program may be provided.

In the above-described embodiment, various programs are transmitted to the direct electrified vehicle 30, but the present disclosure is not limited thereto. For example, the dealer 50 may be notified that various programs are provided to electrified vehicle 30. When electrified vehicle 30 visits the dealer 50, the program may be rewritten by the dealer 50.

Further, the awards provided may not be fixed uniformly for each accumulated point. For example, the privileges provided for each vehicle type (or for each user) may be different from each other.

Further, in the above-described embodiment, VPP servers 10 calculate the accumulated points. However, the present disclosure is not limited to this. The server 20 may acquire point information for each power control from VPP server 10 and calculate an accumulated point based on the point information.

Further, in the above embodiment, electrified vehicle 30 has shown an embodiment capable of performing both the external charge and the external power supply, the present disclosure is not limited thereto. Electrified vehicle 30 may be capable of performing only one of external charging and external power supply.

In the above-described embodiment, the communication unit 23 of the server 20 directly acquires the information of the power control result (accumulated point) from VPP server 10, but the present disclosure is not limited thereto. The communication unit 23 of the server 20 may acquire the track record (cumulative point) from VPP server 10 through electrified vehicle 30 or the mobile terminal 70.

The embodiment disclosed herein should be considered to be exemplary and not restrictive in all respects. The scope of the present disclosure is shown by the scope of claims rather than the description of the above embodiments, and is intended to include all modifications within the meaning and the scope equivalent to the scope of claims.

What is claimed is:

1. A server that manages a communication service for supporting an electrified vehicle that is able to execute power control including at least one of power supply to a power grid and charging from the power grid, the server comprising:

a communication unit that acquires, through communication, information related to a track record of the power control executed by the electrified vehicle in accordance with a request from a power control server that manages the power control; and a control unit that executes control to provide a user of the electrified vehicle with a privilege related to the communication service based on the acquired information related to the track record, wherein the control unit transmits a vehicular program for the communication service to the electrified vehicle of the user via the communication unit based on the acquired information on the track record.

2. The server according to claim 1, wherein the control unit executes control to discount a usage fee of the communication service based on the acquired information on the track record.

3. The server according to claim 1, wherein:

the electrified vehicle includes a first power control program; and the control unit transmits a second power control program that is an updated version of the first power control program to the electrified vehicle of the user via the communication unit when an accumulated value of points accumulated as the power control is executed becomes equal to or larger than a first threshold value.

4. The server according to claim 1, wherein:

the electrified vehicle includes a third power control program corresponding to at least one of normal charge and normal power supply; and the control unit transmits a fourth power control program corresponding to at least one of quick charge and quick power supply to the electrified vehicle of the user via the communication unit when an accumulated value of points accumulated as the power control is executed becomes equal to or larger than a second threshold value.

5. The server according to claim 4, wherein the control unit executes control to provide the user with a vehicular connector corresponding to the at least one of the quick charge and the quick power supply.

6. The server according to claim 1, wherein:

the electrified vehicle includes a light emitting unit that emits light in a predetermined color; and the control unit transmits a color change program for changing the color of the light emitting unit to the electrified vehicle of the user via the communication unit when an accumulated value of points accumulated as the power control is executed becomes equal to or larger than a third threshold value.

7. The server according to claim 1, wherein the communication unit communicates with a mobile terminal of the user in which a travel plan of the electrified vehicle is stored.

8. The server according to claim 1, wherein:

the electrified vehicle includes a navigation system and is electrically connected to a power station to enable the power control; and the control unit executes control to notify the user of the electrified vehicle of a position of the power station through the navigation system.

9. A system provided with the server according to claim 1 and the electrified vehicle, wherein:

the server transmits a vehicular program for a communication service for supporting the electrified vehicle to the electrified vehicle; and the electrified vehicle executes a process of updating a program of the electrified vehicle to the transmitted vehicular program.

* * * * *